United States Patent [19]

Grödum

[11] Patent Number: 4,662,045
[45] Date of Patent: May 5, 1987

[54] METHOD OF PRODUCING A PLASTIC COATED INK ROLLER FOR A PRINTING PRESS

[76] Inventor: Svein Grödum, Tranestien 45, Kristiansand S, Norway, 4600

[21] Appl. No.: 608,083

[22] Filed: May 8, 1984

[30] Foreign Application Priority Data

May 9, 1983 [NO] Norway ............................... 831628

[51] Int. Cl.$^4$ ...................... B29C 55/22; B29C 61/02
[52] U.S. Cl. .............................. 29/148.4 D; 29/447; 156/86; 264/230; 264/249; 264/271.1
[58] Field of Search .................... 29/447, 148.4 D; 264/230, 249, 342 R, DIG. 71; 156/86; 403/273

[56] References Cited

U.S. PATENT DOCUMENTS

| | | | |
|---|---|---|---|
| 1,801,396 | 4/1931 | Thatcher | 264/DIG. 71 |
| 3,226,807 | 1/1966 | Orr | 29/447 |
| 3,481,805 | 12/1969 | Holmes et al. | 156/86 |
| 3,784,663 | 1/1974 | D'Ascoli et al. | 264/230 |
| 3,941,635 | 3/1976 | Tavelle et al. | 264/230 |
| 4,025,751 | 5/1977 | Wright | 29/447 |
| 4,092,382 | 5/1978 | Heckman et al. | 264/230 |
| 4,250,605 | 2/1982 | Chapman | 156/86 |
| 4,325,998 | 4/1982 | Chapman | 156/86 |

Primary Examiner—Willard E. Hoag
Attorney, Agent, or Firm—Wenderoth, Lind & Ponack

[57] ABSTRACT

An ink roller for use in a printing press is produced by crimping a heated tubular plastic jacket onto a metal cylinder. The metal cylinder is heated to a temperature of the same order as the temperature of the heated plastic jacket prior to fitting the latter onto the metal cylinder.

3 Claims, 3 Drawing Figures

METHOD OF PRODUCING A PLASTIC COATED INK ROLLER FOR A PRINTING PRESS

BACKGROUND OF THE INVENTION

The present invention relates to a method of producing plastic coated ink rollers for printing presses, by crimping a heated, tubular jacket of a plastic material, such as PVC, onto a metal cylinder.

Today, rollers for printing presses are usually made from stainless steel, or they are mild steel cylinders coated with vinyl or hard rubber. Since such rollers or cylinders are expensive they are not replaced as often as would be recommendable, which frequently leads to an excessive amount of waste at printing start-up.

For several years experiments have been going on with plastic coated steel rollers, because PVC plastic material shows better properties than steel, copper and nylon with respect to the capability of retaining oil-containing ink when water drops are added to the ink in the damping system of the press during printing. It has also been a requirement that the plastic coated rollers should be capable of withstanding machining in a lathe to pattern their surfaces. However, this requirement has not been fulfilled since one has not succeeded in obtaining a sufficiently stable bonding between the plastic and the steel material of the rollers.

Most plastic materials, including PVC, have a thermal coefficient of expansion substantially higher than those of the metals which are used to form the metal cylinder of the printing rollers, such as steel. A method likely to be suitable for making plastic coated ink rollers would be to crimp a heated tubular plastic jacket onto the metal cylinder, the plastic material upon cooling contracting sufficiently to cause a friction bonding to the metal cylinder. However, practice has shown that the metal cylinder, owing to its high thermal conductivity, causes the plastic coating material to cool down at such a high rate that in order to be able to altogether manage to get the plastic coating onto the cylinder the difference between the external diameter of the metal cylinder and the internal diameter of the heated tubular plastic jacket has to be of such a size that the crimping forces, and consequently the friction forces, after cooling will not be sufficient to retain the plastic jacket on the metal cylinder when external stresses are applied to the plastic jacket, such as when machining it in a lathe. therefore some kind of adhesive or other auxiliary means of mechanical type, such as indentions, protrusions or the like, must be utilized to secure the plastic jacket to the metal. This of course will increase the costs of production, and a reliable bonding is not always obtained.

SUMMARY OF THE INVENTION

Thus, the object of the invention is to provide a method of the above mentioned type which results in a reliable and durable bonding between plastic and metal.

According to the invention this object is achieved by heating the metal cylinder to a temperature level on the order of the temperature of the heated plastic jacket prior to fitting the latter onto the metal cylinder. This method will permit using a very narrow clearance between plastic jacket and metal cylinder during assembly thereof, resulting in correspondingly large crimping or friction forces after cooling. Thus, the end product will be an ink printing roller provided with a firmly fixed plastic coating or jacket without any air pockets between the plastic coating and metal surface and without any risk of the jacket being displaced during machining in a lathe. In addition the plastic jacket may be replaced in a simple and inexpensive manner when needed.

BRIEF DESCRIPTION OF THE DRAWINGS

The invention will now be explained in detail with reference to the accompanying drawing in which.

DETAILED DESCRIPTION OF THE INVENTION

Figure 1:
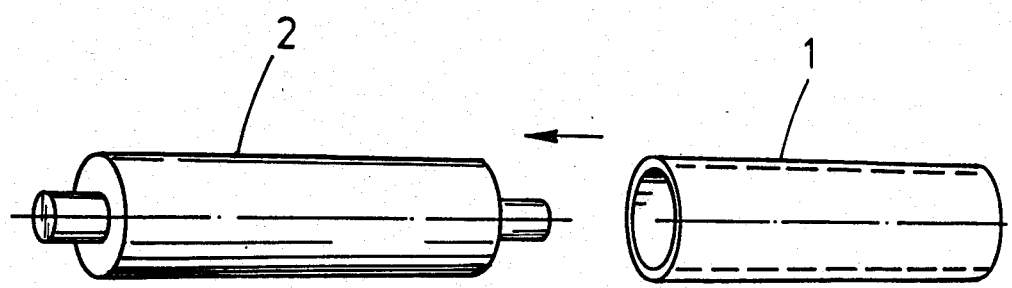
FIG. 1 is a perspective view of steel cylinder and plastic jacket during assembly thereof according to the invention.

Referring to the drawings, a tubular plastic jacket 1 of a suitable material, for example PVC, is to be crimpled onto a metal roller, for example a tubular or solid steel cylinder 2, to form an ink roller 3 for use in a printing press.

The metal cylinder 2 and the tubular plastic jacket 1 are heated in a heating chamber (not shown) to the maximum temperature the plastic material can withstand without being deformed. This causes the internal diameter of the tubular plastic jacket to be slightly larger than the external diameter of the metal cylinder, allowing the plastic jacket to be pushed onto the heated metal cylinder as indicated by the arrow in FIG. 1 in a simple and controllable manner. Owing to the high specific heat of the metal cylinder cooling can take place at room temperature. In each case the internal diameter of the tubular plastic jacket prior to heating is calculated in relation to the coefficient of expansion of the plastic material and the temperature to which the cylinder and jacket is heated. Thus, when using a high impact strength PVC heating of the plastic jacket to about 140° C. and the metal cylinder to about 100° C. will give a good result if the ratio between the interal diameter of the plastic jacket and the external diameter of the steel cylinder is from about 0.97 to about 1.00 at room temperature.

Figure 2:
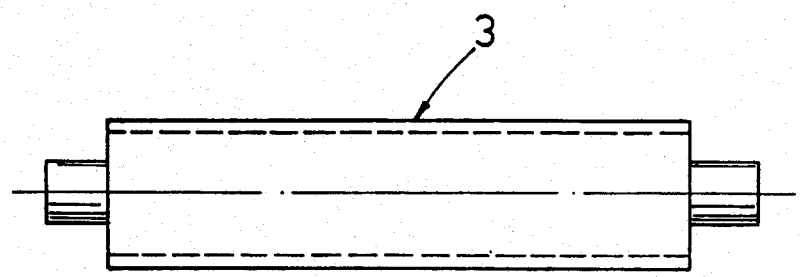
FIGS. 2 and 3 are an elevational view and end view respectively of the ink roller produced by the method according to the invention.
Figure 3:
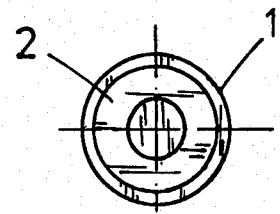

In FIGS. 2 and 3 the plastic jacket 1 has been crimped onto the steel cylinder 2, resulting in the plastic coated ink roller 3.

The nominal diameter and length of ink printing rollers produced according to the invention as described above may vary according to the type of printing machine in question. The surface of the plastic jacket may be smooth (machined to the exact diameter) or patterned (serrated).

I claim:

1. In a method for producing a plastic coated ink roller for a printing press, said method being of the type including heating a tubular jacket of a plastic material such as PVC and thereby expanding the internal diameter of said tubular jacket, fitting the thus heated plastic jacket over a metal cylinder, and allowing said jacket to cool, thereby shrinking onto said cylinder with a tight friction fit therebetween, the improvement of preventing said metal cylinder from cooling and thereby shrinking said tubular jacket during said fitting, and thereby of ensuring that said tubular jacket may be fit over said metal cylinder over the entire lengths thereof, said preventing comprising:

prior to fitting said heated plastic jacket over said metal cylinder, heating said metal cylinder to a temperature on the order of said heated plastic jacket.

2. The improvement claimed in claim 1, comprising heating said metal cylinder and said plastic jacket to the maximum temperature which said plastic material can withstand without being deformed.

3. The improvement claimed in claim 1, wherein said tubular plastic jacket is made of a high impact strength PVC material, the ratio of the internal diameter of said plastic jacket and the external diameter of said metal cylinder at room temperature is from about 0.97 to about 1.00, and said plastic jacket is heated to about 140° C. and said metal cylinder is heated to at least 100° C.

* * * * *